Oct. 1, 1946.    R. MUEHLHOFER    2,408,439
APPARATUS FOR CARBONATING LIQUIDS
Filed June 9, 1943    2 Sheets-Sheet 1
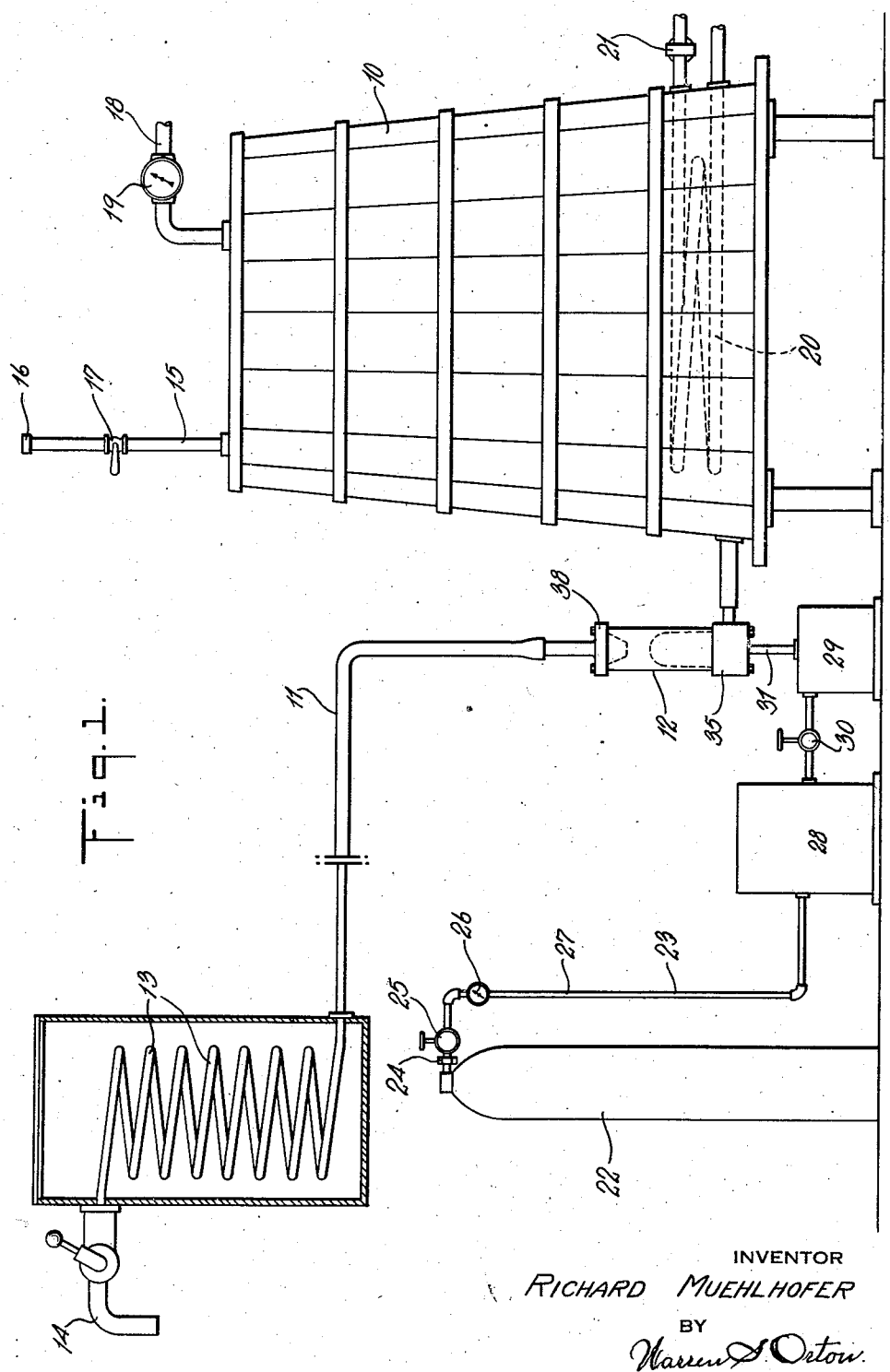
INVENTOR
RICHARD MUEHLHOFER
BY
Warren S. Orton
ATTORNEY

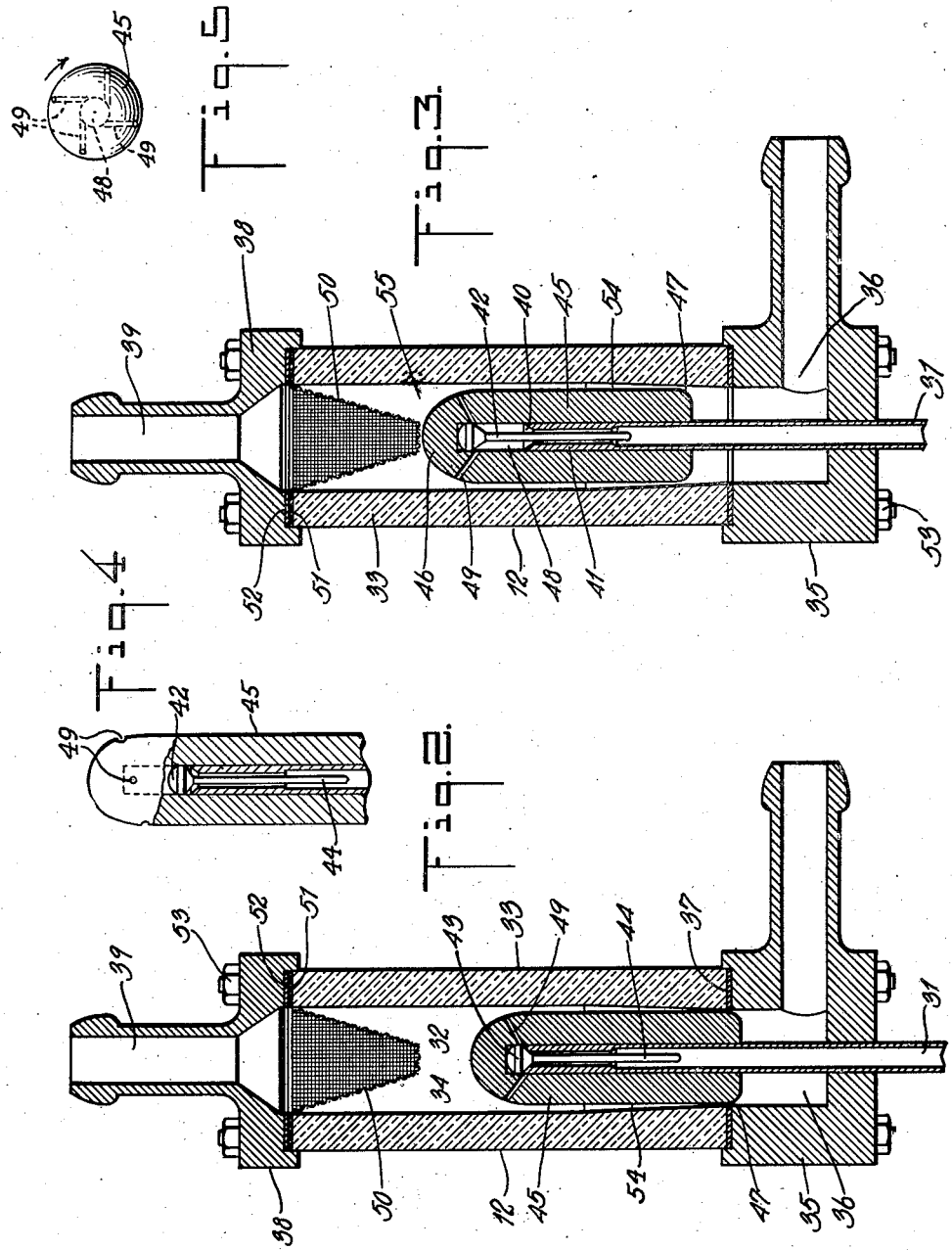

Patented Oct. 1, 1946

2,408,439

UNITED STATES PATENT OFFICE 2,408,439

APPARATUS FOR CARBONATING LIQUIDS

Richard Muehlhofer, Mountainside, N. J.

Application June 9, 1943, Serial No. 490,380

8 Claims. (Cl. 261—50)

The invention relates to apparatus for carbonating beer and other liquids. An object of the invention is to provide apparatus which will be automatic in its operation and simply by the act of opening the faucet a glass of cool vitalized beer may be dispensed with the assurance that every glass so drawn will be freshly charged carbonated beer irrespective of the rate at which the beer is withdrawn and in which there will be assurance that every glass will be the same as every other glass in its carbon dioxide content.

In the drawings:

Fig. 1 is a view in side elevation of a beer storage, carbonating and dispensing equipment and including a carbonator particularly featured in this disclosure;

Fig. 2 and Fig. 3 are each vertical sectional views of the carbonator shown in side elevation in Fig. 1, Fig. 2 showing the beer and gas controlling valves in their normal closed positions and Fig. 3 showing these valves elevated into an open position;

Fig. 4 is a view partly in side elevation and partly in axial section showing the liquid valve elevated from its closed position shown in Fig. 1 and with the gas valve just leaving its seat as it moves towards its position shown in Fig. 2; and Fig. 5 is a plan view looking down on the liquid valve and showing the gas vents in dotted outline.

In the drawings there is disclosed a large storage tank 10 from the bottom of which extends a beer line 11 leading through a carbonator 12 and cooling coil 13 to a dispensing faucet 14 at the dispensing station. The storage tank 10 is provided with a supply line 15 intended to raise to a point where it can be connected conventionally to the tank wagon from the brewery and is supplied with a suitable coupling 16 for connecting with the brewery tank wagon. It is also supplied with a manually actuated control valve 17. For the purpose of maintaining a flow pressure on the beer in the tank 10 and in the beer line 11 leading to the dispensing faucet, there is disclosed a source of air under pressure indicated symbolically by the line 18 which is supplied with an air gauge 19 and leads into the top of the tank 10. In the instant case it has been found in practice that such pressure should be maintained on the tank as will provide a pressure of the order of 15 to 18 pounds in the part of the beer line 11 just before it reaches the carbonator 12. The beer so stored in the tank 10 must be maintained at a temperature of delivery to the beer line of the order of 36 to 38° F., and for this purpose there is located in the lower portion of the tank a cooling coil 20, the temperature of which is controlled by a thermostat valve 21 located in one of the cooling lines connecting the coil 20 with a suitable refrigerating system.

Carbon dioxide gas is supplied to the carbonator 12 from tank 22, replaceably connected to a gas line 23 by means of a coupling 24. The gas line includes in order from the coupling a reducing valve 25, gauge 26, pipe 27, leading to a first auxiliary tank 28. Tank 28 is connected to a second auxiliary tank 29, through a second reducing valve 30. From the second reducing valve, the gas line leads through upstanding tube 31 into mixing chamber 32 of the carbonator.

In one practical application, the initial 600 pound pressure in the supply tank 22 was reduced to about 40 pounds in the first auxiliary tank 28 and to about 20 pounds in the second auxiliary tank 29, so that, as far as pressures are concerned, the beer enters the mixing chamber 32 at about 18 pounds pressure and the gas at a slightly higher pressure, to wit, about 20 pounds. The present disclosure features a step-by-step progressive reducing of the pressure of the gas from its high pressure to a finally reduced pressure only slightly greater than the pressure on the beer at the point where the gas is admitted to the beer line.

Referring to Figs. 2 and 3 for a detailed description of the carbonator 12, it will be seen that it comprises an upstanding open end tube 33 formed of transparent plastic material and thus acts as a sight glass permitting the operator to view the contents of the mixing chamber 32 formed therein. The bore 34 of the tube is of slightly greater diameter at its upper than at its lower end. The lower end of the tube is set into a recess prepared therefor in a metal base or elbow 35 provided with an L-shaped bore 36 forming the inlet thereto from tank 10. Gasket 37 is interposed between the base and the lower end of the tube. Resting on top of the tube 33 is a cap 38 with an axially extending bore 39 which provides an outlet from the carbonator and leads through the balance of the beer line 11 to the faucet 14.

The upstanding gas supply tube 31 extends through the bottom of the base 35 and terminates midlength of the mixing chamber 32. The upper end of the tube 31 provides a conical valve seat 40 and at its upper end the bore of the tube is reduced to form a valve stem guide way 41. The discharge of gas from tube 31 is controlled by a metering gas valve 42 which includes a conical head 43 normally resting by virtue of the weight of the valve on the valve seat 40 and thus shut off any flow of gas therefrom as indicated in Fig. 2. The gas valve includes a conical or rather slightly tapered stem 44 and this portion of the valve and the upper outlet end of the tube 31 is so dimensioned that with progressive increase in displacement of the valve off its seat, there is a progressive increase in the opening of the valve and thus a proportionate increase in the amount of gas discharged from the tube. The valve 42 is so weighted that while it can be elevated off its seat by the pressure of the gas in the tube the failure of, or a sufficient reduction in, this gas pressure will permit the gas valve to close gravitationally.

Located within the mixing chamber 32 is a floating liquid valve 45 hereinafter sometimes called a hood. This hood is of cylindrical form with a rounded head 46 disposed to engage the gas valve to force it into its closed position engaging its valve seat positively to cause a cessation of flow of the liquid through the mixing chamber.

The lower end of the hood in the part marked 47 is so proportioned in its external diameter that it has a sliding fit in the lower and thus most constricted portion of the mixing chamber so that when the hood is in its lowered position as shown in Fig. 2, it acts as a valve to shut off any liquid flow not sufficient to elevate the weighted hood. The hood is provided axially thereof with a bore 48 of small diameter terminating at the head 46 and telescoping the upper portion of the gas tube 31. This arrangement acts to guide the hood in its vertical movement and tends to center the hood in this chamber as it floats up and down. As the hood is in the path of elevating movement of the metering valve it acts as a stop to fix and limit the extent of opening movement of the gas valve. In one case the float was made of brass and had a weight of two tenths of a pound. The floating hood is provided just beneath the head with four radially extending vents 49 for discharging the gas received in the upper end of the bore upwardly and outwardly into the mixing chamber and in such position that four fine streams of gas are discharged forcefully against the inner wall of the sight glass 33. A screen 50 of frusto-conical form is located in the upper portion of the mixing chamber and is provided with an upstanding flange 51 which together with a gasket 52 is disposed between the upper end of the sight glass 33 and the cap 38. Bolts 53 act to secure the parts together.

In operation and assuming operating pressure on the flat beer in the tank 10 and gas pressure as indicated with the faucet 14 closed, and thus with no liquid flow through the mixing chamber 32, the floating hood 45 will be in its lowermost position as shown in Fig. 2 with the hood holding the gas valve 42 in its closed position as indicated. At this time there is, of course, some previously charged beer in the length of the beer line between the carbonator and the faucet but it is the intent of this disclosure as far as possible to maintain this of the smallest possible volume, taking into consideration other necessary requirements such, for instance, as the requirement to raise the beer to the first or second story above the storage tank, and the necessity for filling the beer glass with the usual rapidity. After the beer has remained quiescent over a long period of time, as over night, it is a recommended practice to draw off this small amount of old beer. While the disclosure features the shortest possible length of beer line between the carbonator and faucet still sufficient length of travel of the beer and gas is permitted to insure the thorough mixing of the gas into the beer and to insure a carbonating of the flat beer before it is dispensed.

Under normal operating conditions, the opening of the faucet will, of course, permit the pressure on the beer in the tank to cause a stream of the beer to move upwardly through the mixing chamber 32 and with this unbalancing of liquid pressures in the chamber, the floating hood 45 will be elevated. The hood will, of course, restrict what would otherwise be the free flow of the beer through the mixing chamber. The amount of elevation of the hood will be in proportion to the flow through the device and the elevation of the hood will provide progressively greater clearance between the hood and the conical side of the mixing chamber. The elevation of the hood will, of course, permit the gas pressure in the tube 31 to elevate the gas valve and this gas valve will rise until stopped by the hood in whatever position it may be floating by virtue of the then prevailing flow conditions in the mixing chamber. If the discharge faucet is opened a little more thus permitting a greater flow of liquid, there will be a corresponding raise in both the hood and in the opening of the gas valve.

The parts are so proportioned that irrespective of the flow per unit of time of beer through the chamber there will always be injected into the beer the same ratio of gas to beer so that irrespective of volumetric flow at the faucet the ratio of gas to liquid will be substantially constant. It is noted that as the beer moves upwardly in the mixing chamber it passes first through an annular, constricted and progressively widening column indicated by the space 54 in Fig. 2 formed between the floating hood and the adjacent side of the tube 33 and the liquid then moves suddenly into the relatively wide unrestricted space 55. It is at this point of quick release from the constricted column that the fine streams of carbon dioxide gas are directed through the vents 49 outwardly and radially from the core of the column. It is at this point that a very active ebullition is observed through the sight glass.

It is noted that the vents 49 are disposed so that their discharge ends are arranged in a spiral line thus disposing the gas streams in axially spaced apart position circularly about the head 46. The four outwardly directed gas streams as they are discharged from these vents act on the hollow column of beer as it is discharged from the restricted space 54 to cause the beer to whirl clockwise as it is advanced towards and through the screen 50. This has the effect of whipping the gas into the beer. The gas bubbles are visible as the beer approaches the screen but are not visible in the beer flow after they pass through the screen.

It is particularly noted that the screen is of conical form which provides a screening area much larger than the diameter of the tube in which it is contained and thus of greater cross sectional area of the column of beer passing through the same. The interposition of this fine mesh screen of increased area at the upper portion of the mixing column provides a noticeable increase in the tendency of the gas to be maintained dissolved in the beer. The screen acts to break up the larger gas bubbles, assists in creating turbulence, and apparently acts to insure a more intimate and permanent mixing of the gas into the beer than was the case where the screen was omitted. Without the screened resistance to the flow, there was a greater tendency of the gas to separate from the beer at the point where it was discharged from the faucet 14. The screen also acts as a fixed stop to limit the elevating movement of the hood and thus through the hood to limit the opening movement of the gas valve.

There is thus provided an automatic carbonator which having been once set for any one location, as by the selection of a hood of the proper weight, the setting of the gas valve and the selection of beer line of desired conductive capacity, the device need never again be changed except to replace worn parts like the screen, or for cleaning purposes. Should it be desired to replace the screen and clean out the carburetor, it is simply necessary to loosen the through bolts 53, dismantle the sight tube and associated parts, clean out the base, replace the worn screen with a new screen, add new gaskets if necessary, and reassemble the parts. This, of course, can be done without disarranging the beer line. To facilitate the replacement of the carbonator with another, it is suggested that the connections thereto at opposite ends be lengths of hose and that the gas tube 31 be screwed into the base 35 and connected to the second tank 29 by means of a readily disconnected coupling.

I claim:

1. In a device of the class described, the combination of an upstanding open end tube of transparent material forming a sight tube having a bore of greater diameter at its upper than at its lower end, a base provided with a bore forming a liquid inlet and into which is fitted the lower end of the tube, a cap fitted to the top of the tube and provided with a bore forming an outlet therefrom, a gas supplying tube extending through the base and terminating in an upstanding part within the sight tube, a gas metering valve for controlling the gas discharged from the gas tube and provided with a tapered stem guided in the bore of the gas tube, a hood separate from the gas valve and capable of movement to its open position independently of the position of the gas valve at that instant of time forming a weighted float guided for vertical movement on said upstanding part of the gas tube, normally resting on the gas valve to seat it and thus close off the gas tube, the lower portion of the hood substantially closing the lower end of the sight tube when the hood is resting on the seated gas valve, and said hood provided adjacent its upper end with gas vents for distributing gas from the open gas tube into the liquid as it flows through the sight tube and past the hood when elevated by the flowing liquid and means for limiting the upward movement of the floating hood.

2. In a device for metering a flow of gas under pressure into a stream of liquid under pressure to effect automatically a definite and constant proportion of gas to liquid in the resulting mixture irrespective of the rate of flow of liquid through the device, the combination of a casing provided with an upstanding chamber slightly conical in horizontal cross section with its greater diameter uppermost and tapering downwardly therefrom, said casing provided with an inlet for admitting the liquid into the lower end of the casing and said casing provided at its upper portion with an outlet for the mixture discharged from the chamber, means including an upstanding tube for supplying the gas and having its discharge end providing an upwardly facing valve seat within the chamber, a self-seating valve for controlling the discharge of gas from the tube and normally engaging said seat, means operatively dependent upon the rate of flow of the liquid through the chamber for limiting the opening movement of said gas valve, said last named means including a closed top weighted hood mounted to float in the chamber, normally resting on top of said valve to hold the same in its seated position and thus intercept the gas flow from the tube, otherwise structurally independent of the valve and adapted to be elevated therefrom by the liquid flowing past the same, said hood having an external diameter at its lower end slightly less than the diameter of the portion of the chamber occupied by said lower end when the hood is resting on the seated valve, said hood provided with a bore in which the upper end of the tube is received and also provided with a plurality of vents leading from the upper portion of the bore into the chamber.

3. In a device of the class described, the combination of a casing providing a mixing chamber having a liquid inlet at its lower portion and an outlet leading from its upper portion, a weighted hood guided to float in the chamber for free vertical movement, said chamber and hood relatively contoured to provide a conical type of valve substantially closing off the flow of liquid through the chamber when the hood is in its lowermost position and progressively offering less restriction to the liquid flow as the hood is elevated incidental to the liquid flow upwardly through the chamber, means for supplying gas to said chamber, a gas valve for controlling the gas supplying means, normally in closed position and movable into open position solely by reason of the gas pressure in said gas supplying means, said hood being in the path of opening movement of the gas valve to control and limit its opening movement and at all times acting gravitationally in a tendency to return the gas valve to its closed position and being free to move to and from its seat when the hood is in its open position.

4. In a device for automatically metering a flow of gas under pressure into a stream of liquid to insure a substantially constant ratio of gas to liquid content per unit length of flow in the final mixture, the combination of means forming a mixing chamber, means for causing a stream of liquid to pass upwardly through the chamber, means for injecting a flow of gas into the liquid as it passes through the chamber, a valve normally closing said last named means and opening upwardly from its closed position in response to the gas pressure acting thereon when unrestrained, and valvular means including a weighted float in the chamber operatively controlled by the liquid passing through the chamber to elevate the weighted float and when in said elevated position acting as a variably positioned stop located above the valve and controlling by its extent of elevation the extent of opening movement of the valve and thus cooperating with said valve for automatically regulating the admission of gas to the chamber in direct proportion to the liquid flow and said valve being free to fall towards its closed position in advance of any falling movement of the float.

5. In a device of the class described, the combination of a casing provided with a mixing chamber, a gas supplying tube having its discharge end upstanding in said chamber, a gravity actuated gas valve normally closing said tube whenever the gas pressure acting thereon to open the same is insufficient to elevate the valve, means for supplying a liquid to the chamber, a floating valve guided for vertical movement on said gas tube and acting to control the admission of the liquid from said means into the chamber and said valves when in open position capable of moving in relative opposite directions, said floating valve being disposed in the path of the opening movement of the gas valve for limiting and thus controlling its opening movement.

6. In a device of the class described, the combination of a mixing chamber, means for passing a stream of liquid upwardly through the chamber, a float in the chamber elevating therein in proportion to the flow through the chamber, means for admitting gas into the chamber, a metering valve normally intercepting the gas flow and movable into its open position by the gas pressure in said means and said float in its vertical movement controlling the maximum extent of opening of the gas valve said gas valve falling automatically into closed position independently of the float whenever the gas pressure acting to open it is insufficient to do so, said float being in the path of the opening movement of the gas valve and acting as a stop to limit and control the rise of the gas valve and thus the maximum extent of opening of the gas valve.

7. In a device of the class described, the combination of means forming a beer line provided with a dispensing faucet at its discharge end and including a carbonator free of springs therein having a beer inlet at its lower end and an outlet at its upper end, a long weighted valve having its lower end fitted into and substantially closing the beer inlet, means for causing a column of beer to move along the beer line and upwardly through the carbonator to elevate the valve into progressively enlarged opening positions when the faucet is open, means for ejecting carbon dioxide gas into the column of beer as it passes upwardly through the carbonator a self-closing metering valve separate from the first named valve for closing the gas ejecting means automatically on a reduction of pressure on the gas and a fine mesh screen of conical form extending across said outlet, providing a screening area much larger than the diameter of the column of beer as it moves through the carbonator and acting to assist in diffusing the gas into the beer and acting to form a fixed stop to limit the maximum extent of opening movement of the weighted valve as it is elevated by the upwardly moving column of beer.

8. A valvular construction including a member provided with an upstanding bore, an upper portion of the bore being substantially cylindrical and a lower portion being slightly frusto-conical with its smaller end lowermost, said member being provided with means to introduce liquid upwardly into the lower portion of the bore, a long valve free to move in the bore axially thereof, means for supporting the valve in its lowermost position, said valve being cylindrical at least in its lowermost portion and when in said lowermost position having its lower end fitted in and substantially closing the smaller end of the frusto-conical portion of the bore and said valve forming with the portion of the bore in which it is contained an annular space of progressively increasing cross section considered upwardly from said smaller end towards the cylindrical portion of the bore said long valve supporting means including an upstanding gas supplied tube on which the long valve is guided axially in its movement to and from its lowermost position and a gas controlling valve normally closing the upper end of the gas supplying tube by reason of its own weight, positively held in closed position by the engagement therewith of said long valve when in its lowered position and free to move to and from its tube closing position only when the long valve is elevated from its lowermost position whereby the gas controlling valve is independent of the long valve when said long valve is in its elevated position.

RICHARD MUEHLHOFER.